United States Patent Office 3,105,057
Patented Sept. 24, 1963

3,105,057
PEROXIDE CURED ETHYLENE-BUTENE
COMPOSITIONS
Avrom I. Medalia, Newton, Mass., assignor to Cabot Corporation, Boston, Mass., a corporation of Delaware
No Drawing. Filed Nov. 6, 1958, Ser. No. 772,183
9 Claims. (Cl. 260—41)

This invention relates to novel heat curable compositions comprising copolymers of ethylene and butene-1, substantial amounts of fillers and small amounts of curing agents and to the cured plastomeric compounds therefrom.

It is known that polyethylene can be compounded with carbon black and a small amount of a cross-linking agent to produce a mixture which can be cured to produce a composition that exhibits properties that are in general similar to those of the uncompounded polyethylene but which are in many respects improved over the properties of the uncompounded polyethylene. These cured compositions generally exhibit less tendency to environmental stress-cracking, higher yield stress and ultimate tensile strength, and retention of some strength at temperatures in the neighborhood of the melting point of the uncompounded polyethylene. Nevertheless, certain important deficiencies of these compositions have become apparent. For example, these compositions cannot be reinforced with highly reinforcing pigments, such as fine particle size carbon blacks, without increasing the brittle points of the resulting compositions to values that are too high for certain applications. A further deficiency of these compositions is their reduced strength at temperatures in the melting point range of normal polyethylene. Any attempt to increase the strength of these compositions in the temperature range above the melting point of polyethylene by increasing the loading of filler or by utilizing a more highly reinforcing filler leads to an even higher brittle point. Accordingly, heretofore, the utility of compositions of this type has, in some respects, been rather circumscribed. The improved compositions of the present invention, however, overcome in large part, the problems and disadvantages associated with these prior art compositions.

Accordingly, it is a principal object of this invention to provide novel compositions which can be cured to produce compounds having improved properties.

Another object of this invention is to provide plastomeric compositions having improved properties.

Another object of this invention is to provide novel heat-curable compositions comprising copolymers of ethylene and butene-1, a filler and a curing agent.

Other objects will in part be obvious and will in part appear hereinafter.

In accordance with the present invention, it was discovered that plastomeric copolymers of ethylene and butene-1 when compounded with fillers and a small amount of a curing agent can be cured to produce compounds having greatly improved properties. The copolymers of ethylene and butene-1 suitable for the purposes of the present invention are the plastomeric copolymers of ethylene and butene-1 comprising 5 to 30% by weight butene-1. Copolymers of ethylene and butene-1 comprising substantially more than 30% butene-1 are not plastomeric in nature, whereas copolymers comprising substantially less than 5% butene-1 are not suitable because when compounded and cured according to the teachings of the present invention they do not exhibit properties which are substantially improved over cured polyethylene. Copolymers comprising 7 to 25% by weight butene, however, are generally preferred.

The specific curing agents utilized in the present invention are not in themselves critical. Any of the cross-linking agents which are suitable for cross-linking polyethylene are in general useful as cross-linking agents for the compositions of the present invention. For example, organic peroxides which contain the hydrogen peroxy group (O—O—H) or in which both oxygen atoms of the peroxy group (O—O—) are joined to organic radicals are suitable for the purposes of the present invention. The organic radicals in these peroxides may be selected from the class consisting of alkyl, cycloalkyl, aryl, aralkyl, acyl, alkenyl, cycloalkenyl, and any such groups bearing substituent groups which do not render the peroxide dangerously unstable or so excessively stable that it will not decompose upon the application of amounts of heat which can safely be tolerated by the olefin copolymers. For example, alkyl, cycloakyl, aryl, aralkyl, halogen, hydroxyl, alkoxy, aryloxy, carboxy, nitro and peroxy groups are all generally suitable substituents, at least individually.

Of the above general class of peroxides, the preferred are those which, in the pure state of atmospheric pressure, have boiling points above about 200° F. and which are relatively stable when heated for several minutes at temperatures around this level. These preferred peroxides should likewise be completely miscible with the selected copolymer and hence be least subject to volatilization at the usual masticating and milling temperatures of 150–250° F. In other words, the ideal peroxides for the practice of this invention are those which have atmospheric boiling points above about 200° F., are miscible with the mono-olefinic copolymer and have an intermediate level of stability such that they can be incorporated in the copolymer with safety and yet be decomposed in a reasonable time at curing temperatures which are below that at which degradation of copolymers will occur to any appreciable extent.

The above conditions are met by peroxides of which at least one oxygen atom of the peroxy group (—O—O—) is attached to tertiary carbon, that is, a carbon atom to which are attached three other carbon atoms. Such peroxides may be symmetrical diperoxides such as dicumyl peroxide or hydroperoxides such as cumene hydroperoxide and mixtures of any of these. However, hydroperoxides are preferably used only in admixture with a suitable diperoxide.

Also suitable for use as curing agents in the compositions of the present invention are the quinone oximes and their derivatives as disclosed in copending application, Ser. Nos. 767,756 and 767,776 of D. B. Smith and James C. MacKenzie, filed October 17, 1958, both now abandoned.

In preparing the compounds of this invention the curing agent should be uniformly distributed throughout the copolymer. It may be milled directly into the copolymer prior to shaping or be admixed therewith during the initial curing stage as in an extruder. When a filler is also included the curing agent may first be mixed with the filler and incorporated therewith into the compound. If the curing agent is one on the borderline of stability at mixing temperature it is preferably added to the compound at the last possible moment. When such sensitive curing agent is employed it may likewise be advantageous to use it in conjunction with a more stable curing agent, preferably adding the stable one first and then, near the end of the mixing cycle, adding the sensitive one. Since decomposition of many curing agents, particularly the peroxides, is induced by peroxide decomposition products, the inclusion of less stable peroxides in the mix makes possible the use of very stable peroxides which might not decompose by themselves at curing temperatures optimum for certain copolymers.

Included within the scope of this invention are, of course, compounds as described above containing in addition substantial proportions of fillers. Fillers suitable for the practice of this invention are those commonly employed as reinforcing agents in cured polyethylene. Thus, any finely-divided inorganic pigment such as carbon black, metal oxides and the like containing particles no larger than about 1 micron in size are satisfactory. These fillers may be present in amounts up to about 500 parts by weight per 100 parts of copolymer preferably, in amounts of at least 50 parts by weight per 100 parts of copolymer. Improvement in the properties of the filled compound over the unfilled compound is most notable in respect to strength and resistance to abrasion and to deterioration from weathering and aging. Since these properties are particularly outstanding when carbon black is the filler such filler is naturally to be preferred.

There follow a number of examples which should be regarded as illustrative and as in no way limiting the scope of the present invention.

*Example 1*

A copolymer of ethylene and butene-1 was prepared utilizing a "Ziegler-type" catalyst comprising titanium tetrachloride and aluminum triethyl. The composition of this copolymer as determined by infrared analysis was 10% butene by weight. The solubility of this copolymer in diethylbenzene at 140° C. after 3 hours was 74%; on cooling the solution to room temperature for 20 hours, 14% of the original polymer remained in solution.

A composition comprising 100 parts by weight of this copolymer, 100 parts of super abrasion furnace carbon black (having a particle size of about 20 millimicrons), and 2 parts of dicumyl peroxide was compounded on a hot mill and cured for 15 minutes at 350° F. The resulting compound had a weight tensile strength at room temperature and at 100° C. of 5320 lb./in.$^2$ and 2280 lb./in.$^2$ respectively. Yield stresses measured at the same temperatures were 2900 lb./in.$^2$ and 400 lb./in.$^2$ respectively. These values are suitably high. The brittle point, $-55°$ C., is low enough for general use of the compound. Moreover, a specimen of this compound, $\frac{1}{16}''$ thick, can be nicked with a razor blade and then bent double without breaking.

For the purposes of comparison, a composition comprising 100 parts of "Alathon 10," a polyethylene having a density of 0.92 produced by E. I. du Pont de Nemours & Company, 100 parts of super abrasion furnace carbon black and 2 parts of dicumyl peroxide was compounded on a hot mill and cured for 15 minutes at 350° F. The resulting compound had a yield stress and a tensile strength at room temperature of 3200 lb./in.$^2$ and 3200 lb./in.$^2$ respectively, and at 100° C. of 150 lb./in.$^2$ and 800 lb./in.$^2$ respectively. The brittle point of the compound is $+40°$ C. A specimen of this compound, $\frac{1}{16}''$ thick, snaps on being bent double.

*Example 2*

A copolymer of ethylene and butene-1 was prepared as in Example 1. The butene content as determined by infrared analysis was 20% by weight. The solubility of the raw polymer in diethylbenzene at room temperature after heating and then cooling for 20 hours was 28%. A composition comprising 100 parts by weight of this copolymer, 100 parts of super abrasion furnace carbon black, and 2 parts of dicumyl peroxide was compounded on a hot mill and thereafter cured for 15 minutes at 350° F. The resulting compound had a tensile strength and yield stress at room temperature of 5160 lb./in.$^2$ and 1150 lb/in.$^2$ respectively, and at 100° C. of 1880 lb./in.$^2$ and 280 lb./in.$^2$ respectively.

*Example 3*

100 parts of the copolymer of Example 2 was compounded with 300 parts of "Sterling" medium thermal carbon black (produced by Godfrey L. Cabot, Inc. and having an average particle size of about 470 millimicrons) and 2 parts of dicumyl peroxide and cured for 15 minutes at 350° F. Tensile strength and yield stress at room temperature were 4240 lb./in.$^2$ and 3320 lb./in.$^2$ respectively, and the corresponding properties at 100° C. were 2240 lb./in.$^2$ and 1200 lb./in.$^2$ respectively. The brittle point was $-55°$ C. and the compound was highly flexible. Comparably loaded compounds based on polyethylene alone have much higher brittle points and much less flexibility.

*Example 4*

Two copolymers of ethylene and butene-1 were prepared in the same manner as the copolymer of Example 2. The weight percent butene in one of the copolymers as determined by infrared analysis was 18.5%. The weight percent butene of the other copolymer, determined in the same manner, was 19.5%. A mixture of 102 grams of the 18.5% butene copolymer was mixed with 125 grams of the 19.5% butene copolymer and was milled on a hot mill for 45 minutes. The resulting mixture was extracted in diethylbenzene for 3 hours at a temperature of 140° C. The mixture was 70% soluble. At room temperature, the mixture was 16% soluble after cooling for 20 hours. The intrinsic viscosity in diethylbenzene at 140° C. of that portion of the polymer which was soluble at 140° C. was 2.52.

100 parts of this mixture were compounded on a hot mill with 100 parts of super abrasion furnace carbon black and 2 parts of dicumyl peroxide and cured for 15 minutes at 350° F. The resulting compound had a yield stress and tensile strength at room temperature at 3160 lb./in.$^2$. At 100° C., the tensile strength and yield stress were both 940 lb./in.$^2$. The brittle point was $-60°$ C. The low brittle point and the excellent flexibility of this compound at room temperature (permitting a $\frac{1}{16}''$ sheet to be bent double without breaking) are very unusual properties for a compound of such relatively high tensile strength and yield stress.

Curing of the compositions of this invention may be effected by any convenient means. It is merely necessary that the compound be heated for a sufficient period of time and at a temperature sufficient to decompose substantially all of the curing agent. Normally, heating between 275° F. and 500° F. and preferably above about 300° F., for at least two minutes will effect some cure and heating may be continued for as much as two hours when conditions require. Alternatively, the compound can be cured by high frequency dielectric heating in which case, cure can be complete within about 5 to 60 seconds.

What I claim is:

1. A composition which can be cured to produce a plastomeric compound having exceptional flexibility and strength which comprises a copolymer derived entirely from ethylene and butene-1, said copolymer containing 5 to 30% butene by weight, a finely divided filler and an organic peroxide curing agent.

2. The composition of claim 1 which contains 50 to 500 parts by weight per 100 parts of the copolymer of a filler.

3. The composition of claim 1 wherein said filler is carbon black.

4. A plastomeric compound having exceptionally high flexibility and strength which comprises a copolymer derived entirely from ethylene and butene-1 containing 5 to 30% butene by weight and a filler cured by an organic peroxide curing agent.

5. A plastomeric compound having exceptionally high flexibility and strength which comprises a copolymer derived entirely from ethylene and butene-1 containing 5 to 30% butene by weight, and between 50 and 500 parts by weight of the copolymer of a finely divided filler cured by an organic peroxide curing agent.

6. The compound of claim 4 wherein said filler is carbon black.

7. A process for producing a plastomeric composition having exceptional flexibility and strength which comprises compounding a copolymer derived entirely from ethylene and butene-1 containing 5 to 30% butene with a finely divided filler and an organic peroxide curing agent and thereafter curing the resulting compound.

8. A process for producing a plastomeric composition having exceptional flexibility and strength which comprises compounding a copolymer derived entirely from ethylene and butene-1 containing 5 to 30% butene with 50 to 500 parts by weight of the copolymer of a finely divided filler and an organic peroxide curing agent, and thereafter curing the resulting compound.

9. The process of claim 7 wherein said filler is carbon black.

References Cited in the file of this patent
UNITED STATES PATENTS

| | | |
|---|---|---|
| 2,200,429 | Perrin et al. | May 14, 1940 |
| 2,628,214 | Pinkney et al. | Feb. 10, 1953 |
| 2,888,424 | Precopio et al. | May 26, 1959 |
| 2,927,904 | Cooper | Mar. 8, 1960 |
| 2,958,672 | Goldberg | Nov. 1, 1960 |
| 2,975,159 | Weinmayr | Mar. 14, 1961 |
| 2,997,452 | Makowski et al. | Aug. 22, 1961 |
| 3,012,016 | Kirk et al. | Dec. 5, 1961 |
| 3,012,020 | Kirk et al. | Dec. 5, 1961 |